United States Patent
Oh et al.

(10) Patent No.: US 7,539,211 B2
(45) Date of Patent: May 26, 2009

(54) DYNAMIC BANDWIDTH ALLOCATION METHOD CONSIDERING MULTIPLE SERVICES IN ETHERNET PASSIVE OPTICAL NETWORK SYSTEM

(75) Inventors: Ho-Il Oh, Seoul (KR); Min-Hyo Lee, Suwon-shi (KR); Su-Hyung Kim, Seoul (KR); Young-Seok Kim, Songnam-shi (KR); Yun-Je Oh, Yongin-shi (KR); Tae-Sung Park, Yongin-shi (KR); Young-Chon Kim, Chonju-shi (KR); Hyuk-Gyu Park, Chonju-shi (KR); Kye-Hyun Ahn, Taejonkwangyok-shi (KR); Kyeong-Eun Han, Chonju-shi (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 873 days.

(21) Appl. No.: 10/691,378

(22) Filed: Oct. 22, 2003

(65) Prior Publication Data
US 2004/0252714 A1    Dec. 16, 2004

(30) Foreign Application Priority Data
Jun. 16, 2003    (KR) ...................... 10-2003-0038883

(51) Int. Cl.
*H04J 3/16*    (2006.01)
(52) U.S. Cl. ...................................... 370/468; 370/477
(58) Field of Classification Search ................. 370/229, 370/230, 230.1, 235, 252, 253, 468, 412, 370/437, 477
See application file for complete search history.

(56) References Cited

U.S. PATENT DOCUMENTS

| | | | |
|---|---|---|---|
| 6,546,014 B1 * | 4/2003 | Kramer et al. | 370/395.41 |
| 6,804,256 B2 * | 10/2004 | Chang | 370/468 |
| 7,180,910 B2 * | 2/2007 | Kim et al. | 370/468 |
| 2003/0007508 A1 * | 1/2003 | Sala et al. | 370/468 |

(Continued)

FOREIGN PATENT DOCUMENTS

EP    0957654 A1    11/1999

(Continued)

OTHER PUBLICATIONS

Jang, Jongwoo, et al; "Dynamic Resource Allocation for Quality of Service on a PON with Home Networks;" IEEE Communications Magazine; Piscataway, NJ; vol. 38, No. 6; Jun. 2000; XP011091312.

(Continued)

*Primary Examiner*—Ricky Q. Ngo
*Assistant Examiner*—Gary Mui
(74) *Attorney, Agent, or Firm*—Cha & Reiter, LLC

(57) ABSTRACT

A Dynamic bandwidth allocation method using OLT (Optical Line Terminal) and ONU (Optical Network Unit) for use in GE-PON (Gigabit Ethernet Passive Optical Network) system is disclosed. The OLT's scheduler performs scheduling upon receiving multiple-queue request information contained in the REPORT message from the ONU, and transmits a combined scheduling result associated with one ONU using a GATE message. An ONU's scheduler performs scheduling upon receiving a bandwidth allocated by the OLT, and allocates a transfer bandwidth to its own queues.

8 Claims, 7 Drawing Sheets

U.S. PATENT DOCUMENTS

| | | | |
|---|---|---|---|
| 2003/0133460 A1* | 7/2003 | Lee et al. | 370/395.43 |
| 2003/0170032 A1* | 9/2003 | Song et al. | 398/168 |
| 2003/0179769 A1* | 9/2003 | Shi et al. | 370/442 |
| 2004/0052274 A1* | 3/2004 | Wang et al. | 370/468 |
| 2004/0141759 A1* | 7/2004 | Stiscia et al. | 398/168 |
| 2006/0013138 A1* | 1/2006 | Haran et al. | 370/236 |

FOREIGN PATENT DOCUMENTS

| | | |
|---|---|---|
| EP | 1315396 A1 | 5/2003 |

OTHER PUBLICATIONS

Yoshihara, Shin-ichi, et al.; "A Dynamic Bandwidth Assignment Algorithm for B-PON;" IEEE Global Telecommunications Conference, vol. 1; New York, NY; Nov. 17, 2002; XP010636395.

* cited by examiner

DYNAMIC BANDWIDTH ALLOCATION METHOD CONSIDERING MULTIPLE SERVICES IN ETHERNET PASSIVE OPTICAL NETWORK SYSTEM

CLAIM OF PRIORITY

This application claims priority to an application entitled "DYNAMIC BANDWIDTH ALLOCATION METHOD CONSIDERING MULTIPLE SERVICES IN ETHERNET PASSIVE OPTICAL NETWORK SYSTEM," filed in the Korean Intellectual Property Office on Jun. 16, 2003 and assigned Ser. No. 2003-38883, the contents of which are hereby incorporated by reference.

BACKGROUND OF THE INVENTION

1. Field of the Invention

The present invention relates to a PON (Passive Optical Network) system and more particularly to a method for allocating bandwidth used for data transmission to an ONU (Optical Network Unit) in a GE-PON (Gigabit Ethernet Passive Optical Network) system.

2. Description of the Related Art

Because of the growing wide bandwidth multimedia demands and Internet usage, FTTH (Fiber To The Home) techniques for installing optical lines to individual homes and PON (Passive Optical Network) systems have been developed. Typical PON systems have a Point-To-Multipoint access structure that allows a plurality of ONUs (Optical Network Units) to share with an OLT (Optical Line Termination) via one optical fiber. Such PON systems are classified as either an ATM-PON (hereinafter referred to as an APON) system or an Ethernet PON (hereinafter referred to as an EPON) system according to the data transfer method for communicating with subscribers.

The APON system has limitations in the bandwidth range and has a maximum bandwidth of 622 Mbps. The APON also needs to perform IP (Internet Protocol) packet segmentation. In contrast, the EPON system has a high bandwidth of about 1 Gbps. In addition, the PON system has a low production cost so that the EPON system is regarded as being generally superior to the APON system.

FIG. 1 is a block diagram of a conventional EPON system. The EPON system includes one OLT 10, an ODN (Optical Distribution Network) 20, and a plurality of ONUs 30-1, 30-2, . . . , 30-N. The OLT 10 is connected to the ONUs 30-1 to 30-N via the ODN 20. The OLT 10 is located on a tree structure route, and plays an important role in providing each subscriber in an access network with information. The OLT 10 has a tree topology, and is connected to the ODN 20. The ODN 20 distributes downstream data frames received from the OLT 10 to the ONUs 30-1 to 30-N, or multiplexes upstream data frames received from the ONUs 30-1 to 30-N according to a TDM (Time Division Multiplexing) scheme to transmit the multiplexed data frames to the OLT 10. The ONUs 30-1 to 30-N receive downstream data frames, transmit them to end users 40-1, 40-2, . . . , 40-N, and transmit output data of the end users 40-1 to 40-N to the OLT 10 via the ODN 20 as an upstream data frame functioning as a variable length Ethernet frame. The end users 40-1 to 40-N represent a variety of access network termination units available to a PON having an NT (Network Terminal).

A GPS (Generalized Processor Sharing) system is used to share resources between one OLT 10 and ONUs 30-1 to 30-N connected to the OLT 10 in a point-to-multipoint EPON structure. In more detail, the point-to-multipoint EPON system adapts the GPS system to support a fair-queuing algorithm. By applying such a GPS-based algorithm to the EPON system, a scheduler positioned at the OLT schedules a variety of queues positioned at the ONU. However, it is impossible for the scheduler to successfully perform such a fair-queuing algorithm when there is an excessive bandwidth demand.

FIG. 2 depicts a single scheduling process of a GPS-based bandwidth allocation algorithm in the EPON system.

Referring to FIGS. 1 and 2, the ONUs 30-1 to 30-N register in the OLT 10 indicate their existence and their locations. They are then allocated IDs. If the OLT 10 provides the ONUs 30-1 to 30-N with a data transfer opportunity by means of an upstream data transfer opportunity grant frame, the ONUs 30-1 to 30-N recognize the amount of data contained in their queues 32, insert the recognized queue values into a bandwidth allocation request frame, and transmit the resultant frame to the OLT 10. The upstream data transfer opportunity grant frame is a downstream packet for providing one of the ONUs 30-1 to 30-N with an upstream data transfer opportunity. The bandwidth allocation request frame is an upstream packet for enabling one of the ONUs 30-1 to 30-N to send a bandwidth allocation request to the OLT 10 upon receiving a permission message from the OLT 10.

Upon receipt of the bandwidth allocation requests from the ONUs 30-1 to 30-N, the scheduler 12 of the OLT 10 allocates appropriate data transfer bandwidths to the ONUs 30-1 to 30-N. The OLT 10 inserts a bandwidth allocation result received from the scheduler 12 into an upstream data transfer opportunity grant frame of the next timeslot, and transmits the result frame to the ONUs 30-1 to 30-N. Allocation information is composed of first time information indicating a data transfer start time and second time information indicating a data transfer duration time. The ONUs 30-1 to 30-N receiving the first and second time information transmits data to the OLT 20 during their unique allocation times.

The EPON system provides a specific working process with priority information to easily transmit video or audio data. The classification of priority information of Ethernet frames is determined according to 3-bit VLAN (Virtual Local Area Network) tag information of the Ethernet frames and user-defined port priority information. In this way, individual ONUs contain one or more queues allocated to individual subscribers. Multiple queues belonging to individual subscribers are adapted to provide the subscriber with other class or other traffic services such as audio, video, and data services.

The above GPS-based bandwidth allocation algorithms fairly allocate/transmit appropriate bandwidths to individual queues of the ONUs. They have limitations, however, in extensibility and efficiency of an EPON system due to the following three disadvantages (a) to (c).

a) Transmission Delay in System Control Process:

If it is assumed that the algorithms used with the GPS system create a very small transmission delay, then a variation in the queue status is immediately transferred to the scheduler, and the scheduler can immediately recognize a changed packet size caused by the queue status variation. This assumption is true when system or queue of a single chip is close to a scheduler. However, because the EPON system is a distributed system, the transfer delay time between the scheduler and the queues is longer than a packet transmission time. In addition, the ONU performs data transmission only during its own allocation timeslot time so that data of the ONU does not collide with data of other ONUs. Accordingly, a REPORT message that indicates queue status variation information must be transmitted over a previously-allocated timeslot. This causes the control message delay to be further increased along with the transmission delay.

b) Limited Control Bandwidth:

GATE messages for every queue and REPORT messages for every queue are needed to perform scheduling on a variety of queues. The GATE messages for every queue must be transferred to individual queues, and the REPORT messages for every queue must transmit bandwidths requested by individual queues. For example, if there are 32 ONUs that provide 128 subscribers with desired services and each subscriber has three queues, then 12288 queues are created. If one queue of the three queues provides video data service having a maximum delay of 1.5 ms, 4096 GATE messages must be transmitted within a prescribed range of 1.5 ms. However, a predetermined time of 2.75 ms is consumed to transmit such GATE messages, such that queues for 4096 video services cannot be supported due to the limited control bandwidth.

c) Switch-Over Overhead:

A packet-based GPS system schedules packets on the basis of its virtual termination time. Virtual time information is affected by packet reception time and relative weights for every access point. It is noted, however, that this operation can be performed when packets are successively received from other queues positioned at other ONUs. The EPON system requires a guard time between packets transferred from other queues positioned at other ONUs. Therefore, in the case of considering a mean Ethernet packet size of 500 bytes, link capacity of 1 Gbps, and a guard time of 1 μs, an overhead of 20% is created. If a minimum Ethernet packet size of 64 bytes is transmitted, an overhead of 66% is created.

In conclusion, the aforementioned conventional packet-based GPS algorithm has significant shortcomings for use with EPON systems.

SUMMARY OF THE INVENTION

One object of the present invention to provide a dynamic bandwidth allocation method that improves extensibility and efficiency of an EPON system.

One embodiment of the present invention is directed to a method for allocating a hierarchically-structured bandwidth to effectively provide individual subscribers with a variety of communication services having various characteristics.

Another embodiment of the present invention is directed to a dynamic bandwidth allocation method for a GE-PON (Gigabit Ethernet Passive Optical Network) system which includes one OLT (Optical Line Terminal) and a plurality of ONUs (Optical Network Units) connected to the OLT via an ODN (Optical Distribution Network). The method is used to control the OLT to allocate a bandwidth to each of the ONUs according to a bandwidth request signal for transferring data of the ONUs. The method includes the steps of: a) selecting a minimum bandwidth guaranteed for individual services requested by the ONUs from among an overall available bandwidth, and allocating the minimum bandwidth to the ONUs; b) if a current available bandwidth is found in the overall available bandwidth after allocating the minimum bandwidth to the ONUs sending the bandwidth request signal, allocating bandwidths requested by the ONUs when the sum of the bandwidths requested by the ONUs is lower than the current available bandwidth, determining new request bandwidths associated with the ONUs upon receiving magnitude and weight information of individual queues from the ONUs when the sum of the bandwidths requested by the ONUs is higher than the current available bandwidth, and performing bandwidth allocation in proportion to the determined request bandwidths.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
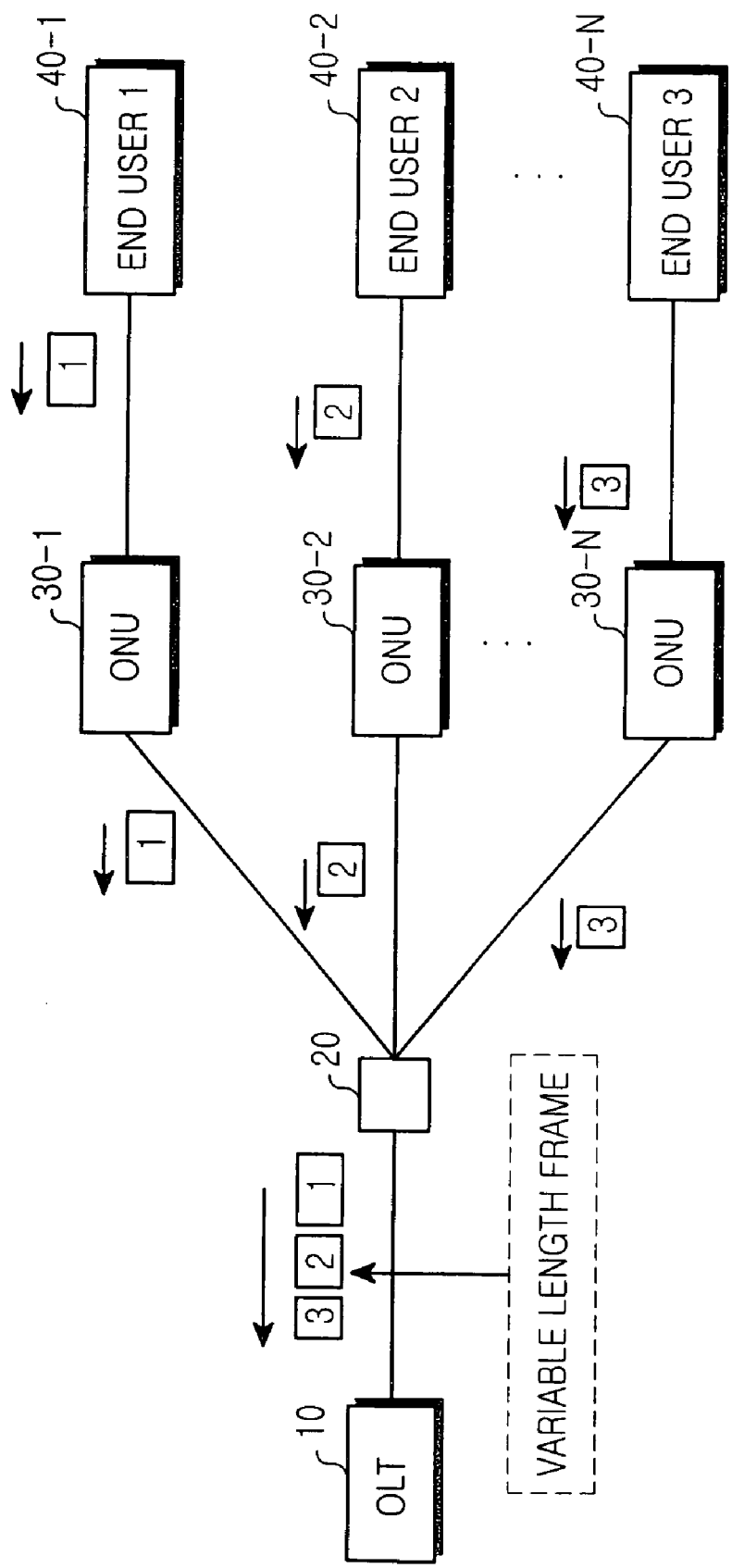
FIG. 1 is a block diagram of a conventional EPON system.
Figure 2:
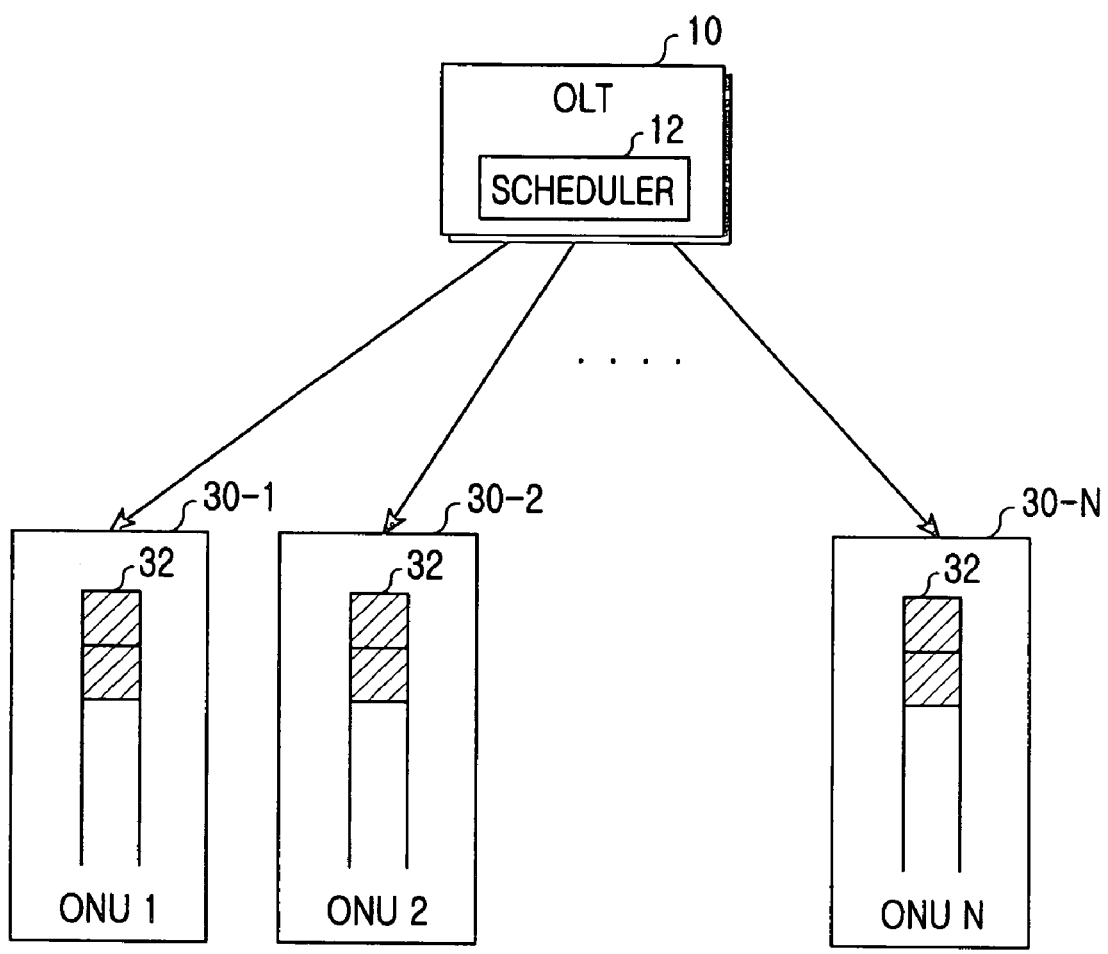
FIG. 2 depicts a single scheduling of a GPS-based bandwidth allocation algorithm for use in the EPON system.

Now, embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may obscure the subject matter of the present invention.

Figure 3:
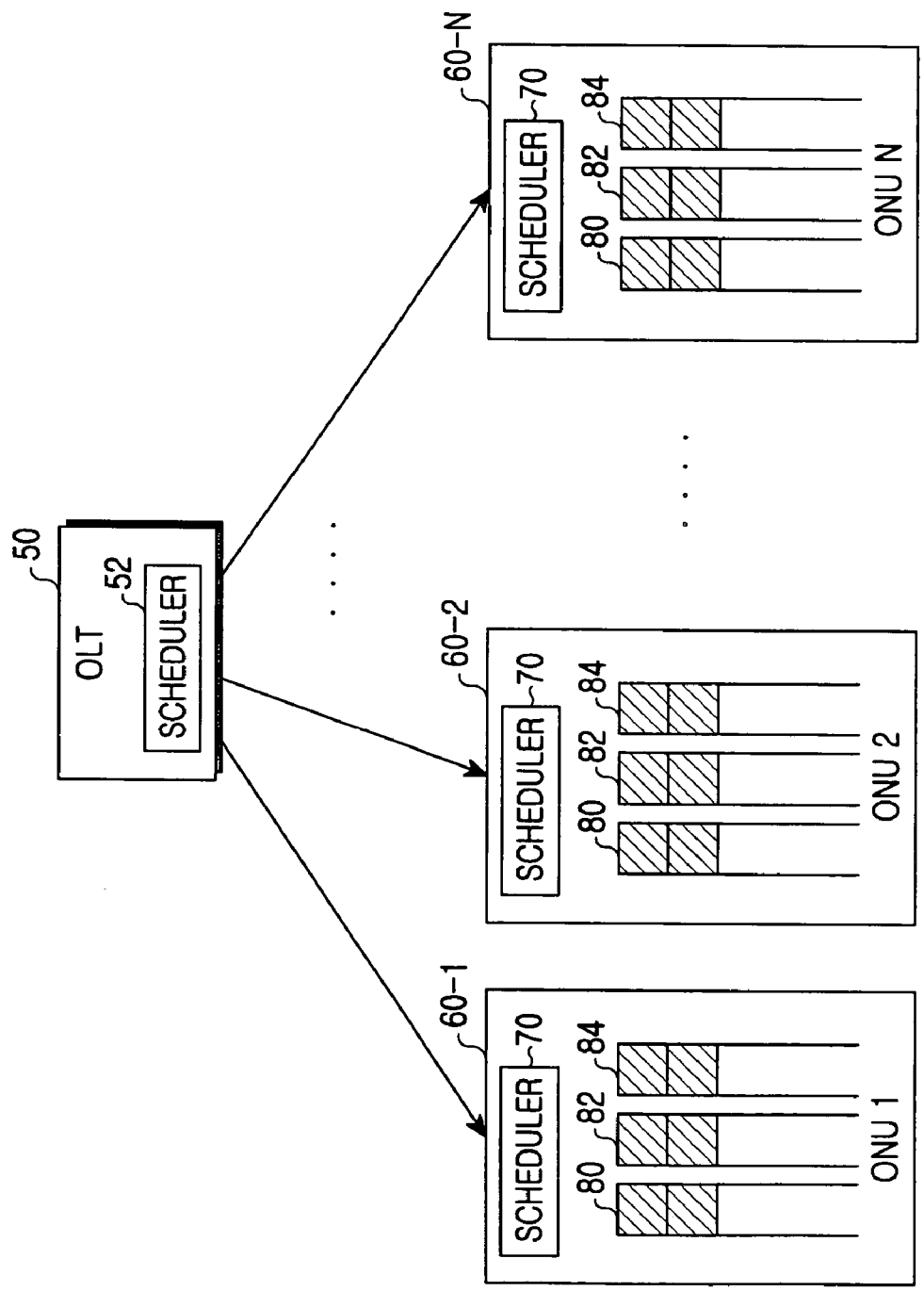
FIG. 3 depicts a hierarchical structure of the bandwidth allocation algorithm in accordance with aspects of the present invention.

FIG. 3 depicts a hierarchical structure of a bandwidth allocation algorithm in accordance with aspects of the present invention. All the queues are classified into a plurality of groups. An upstream scheduler (i.e., an upper scheduler) schedules the groups, and a downstream scheduler (i.e., a lower scheduler) schedules queues of individual groups, thereby creating a hierarchical structure.

The EPON system has a hierarchical structure where the upstream scheduler contained in the OLT 50 and the downstream schedulers contained in the ONUs 60-1 to 60-N have a hierarchical structure. FIG. 3 depicts a hierarchical structure algorithm for the EPON system. The OLT and the ONUs have different scheduling algorithms to implement the hierarchical algorithm design. Individual schedulers of the OLT and ONUs perform scheduling based on weights assigned to individual service queues and current queue information.

In more detail, the OLT 50 perform a DBA (Dynamic Bandwidth Allocation) function to transfer data to the ONUs 60-1 to 60-N. The ONUs 60-1 to 60-N each includes a plurality of queues according to service class information. The plurality of queues is classified into at least a normal queue, a priority queue, and a high-priority queue. As previously stated, a service class of an Ethernet frame is indicated by a 3-bit VLAN tag such that a maximum of eight service classes can be indicated by the 3-bit VLAN tag. A priority order using the VLAN tag ranges from 1 to 7 according to the IEEE 802.1p standard. The highest priority order is 7, and the lowest priority order is 1. In one embodiment of the present invention priorities for every class are considered using the VLAN tag and a total of four classes are used. The eight available priorities are mapped to the four classes. This may be done in a variety of implementation methods based upon system requirements. It is noted, however, that because voice data service requires the highest data security, it can be assigned the highest priority instead of being inserted in the class. This voice data service method is applied is various embodiments of the present invention. In more detail, aspects of the present invention describe the fact that EPON classes can be classified according to VLAN tag information.

First, it is assumed that no queue is given to the highest-priority Ethernet frame that unconditionally passes through the ONU without being stored in a queue of the ONU, and thereby four service classes are available.

Each of the ONUs 60-1 to 60-N stores data traffic applied to individual queues 80, 82 and 84, and includes a scheduler 70 for performing a DBA (Dynamic Bandwidth Allocation) process on these queues 80 to 84 in consideration of individual service classes to guarantee a QoS (Quality of Service).

Figure 4:
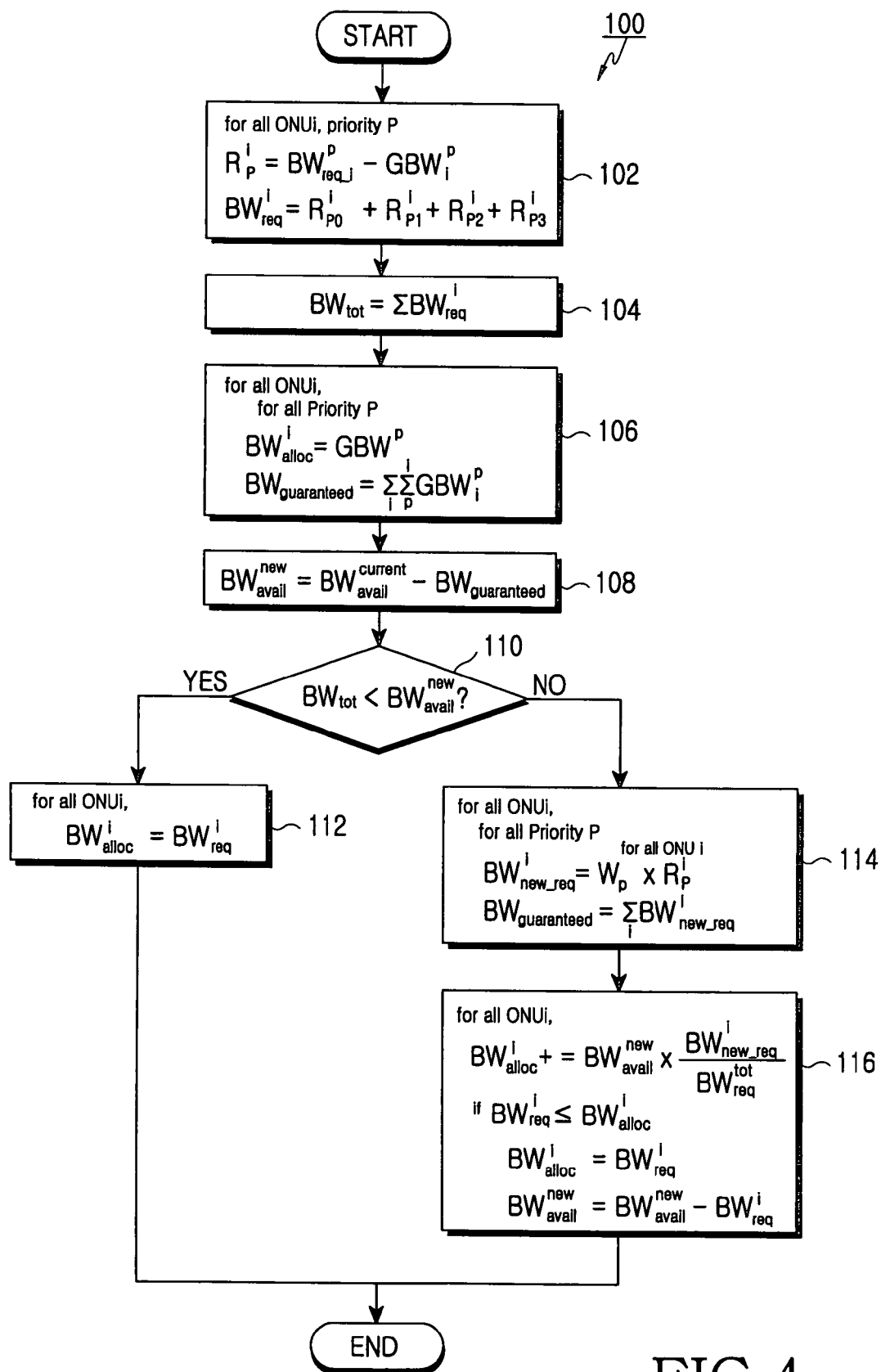
FIG. 4 is a flow chart illustrating a proportional allocation method for performing dynamic bandwidth allocation in an OLT in accordance with aspects of the present invention.

A dynamic bandwidth allocation method for the OLT and another dynamic bandwidth allocation method for the ONUs will be described in detail with reference to FIGS. 4 to 7. Parameters shown in FIGS. 4 to 7 are defined as follows. Parameters shown in FIGS. 3 and 4 are defined as follows. $BW_{alloc}$ is an allocated bandwidth, $BW_{guaranteed}$ is a minimum guarantee bandwidth, $BW_{req}$ is a requested bandwidth, $BW_{avail}$ is an available bandwidth, $BW_{avail}^{new}$ is a new available bandwidth, p is adapted to identify individual priorities of service classes, and i designates a specific ONU. i is a total number of ONUs ranging from 1 to i.

1) Dynamic Bandwidth Allocation (DBA) Algorithm for OLT:

A scheduler of the OLT recognizes bandwidths requested by queues of individual ONUs and weights of the queues upon receiving priority field information of a received REPORT message and queue request field information, and the scheduler allocates transmission bandwidth available for the next frame using a single ONU upon receipt of the recognized bandwidths and weights information.

FIG. 4 is a flow chart illustrating a proportional allocation method for performing dynamic bandwidth allocation in such an OLT in accordance with aspects of the present invention. Considering bandwidths requested by queues of individual ONUs and weight of the queues, a transmission bandwidth available for the next frame by means of a single ONU is allocated.

The scheduler 52 of the OLT 50 recognizes bandwidths requested by queues of individual ONUs 60-1 to 60-N and weights of the queues upon receiving priority field information of the received REPORT message and queue request field information, and the scheduler 52 allocates transmission bandwidth available for the next frame by means of a single ONU in light of the recognized bandwidths and weights information. The OLT's scheduler performs a proportional allocation algorithm to determine an allocation bandwidth. The OLT 50 collects request bandwidth information from the ONU upon receiving the REPORT messages for every frame to recognize bandwidth information requested by all ONUs, compares the recognized bandwidth information with an available bandwidth of the next frame, and allocates individual bandwidths to the ONUs according to the result of the comparison.

Referring to FIG. 4, the scheduler 52 of the OLT 50 allocates a fixed allocation bandwidth $GBW_i^{PO}$ for a P0 service and a minimum guarantee bandwidth $GBW_i^{P1,P2}$ for P1 and P2 services at step 102. The sum $R_p^i$ of overall request bandwidths is obtained by subtracting the minimum guarantee bandwidth $GBW_i^{P1,P2}$ from the total sum $BW_{req_i}^P$ of requested bandwidths for every priority of all ONUs at step 102, and the request bandwidths of the ONUs are added for every priority at step 104 in such a way that the total sum $BW_{tot}$ of request bandwidths other than the minimum guarantee bandwidth $GBW_i^{P1,P2}$ can be recognized. $BW_{tot}$ is compared with an available bandwidth $BW_{avail}^{new}$ at step 110, and an algorithm can be performed according to the result of the comparison.

After finishing allocation of the minimum guarantee bandwidth $GBW_i^{P1,P2}$, the scheduler 52 of the OLT 50 calculates the sum of minimum guarantee bandwidths associated with the ONUs 60-1 to 60-N at step 106. The sum of minimum bandwidths guaranteed for individual services must be less than an overall available bandwidth. The scheduler 52 subtracts the sum of minimum guarantee bandwidths from a current available bandwidth at step 108 to obtain a new available bandwidth $BW_{avail}^{current}$. The scheduler 52 compares the sum $BW_{tot}$ of requested bandwidths with the new available bandwidth $BW_{avail}^{current}$ at step 110. If $BW_{tot}$ is less than $BW_{avail}^{current}$ at step 110, the scheduler 52 of the OLT 50 allocates bandwidths equal to requested bandwidths of individual ONUs.

If $BW_{tot}$ is higher than $BW_{avail}^{current}$ at step 110, the scheduler 52 determines a new request bandwidth $BW_{new\_req}^i$ of each ONUi considering a queue magnitude of each ONUi and a weight of each queue at step 114. The scheduler 52 of the OLT 50 determines an allocation bandwidth corresponding to the available bandwidth $BW_{avail}^{new}$ in proportion to a new request bandwidth of each ONUi according to the following equation 1.

$$BW_{alloc}^i = BW_{AVAIL}^{@W} \frac{BW_{new\_req}^i}{BW_{new\_req}^{tot}} \quad \text{[Equation 1]}$$

The scheduler 52 of the OLT 50 compares the bandwidth proportionally allocated to ONUi with another bandwidth actually requested by the ONUi. If the proportionally allocated bandwidth is larger than the actually requested bandwidth, the scheduler 52 allocates the bandwidth equal to the requested bandwidth. In this way, a weight is applied to the allocated bandwidth so that a bandwidth larger than the requested bandwidth is not allocated to each ONUi.

2) Dynamic Bandwidth Allocation Algorithm for ONUs:

Bandwidth request information associated with individual service queues is transmitted to the OLT 50 through a queue request field of the REPORT message. The bandwidths allocated to the ONUs 60-1 to 60-N by means of a scheduling of the OLT 50 are equal to a bandwidth allocated to an overall request bandwidth range. Therefore, the ONUs 60-1 to 60-N must properly distribute their allocation bandwidths to their priority queues to obtain their transfer opportunities. A proportional allocation algorithm can be considered to be a scheduling algorithm for providing the priority queues with transfer opportunities. However, the scheduler of the OLT and the scheduler of the ONU repeatedly perform such a proportional allocation algorithm, resulting in a wasted bandwidth unable to be used to perform actual packet transmission. To solve this problem, one aspect of the present invention provides an MRFA (Maximum Request First Allocation) algorithm and an HPFA (High Priority First Allocation) algorithm.

Figure 5:
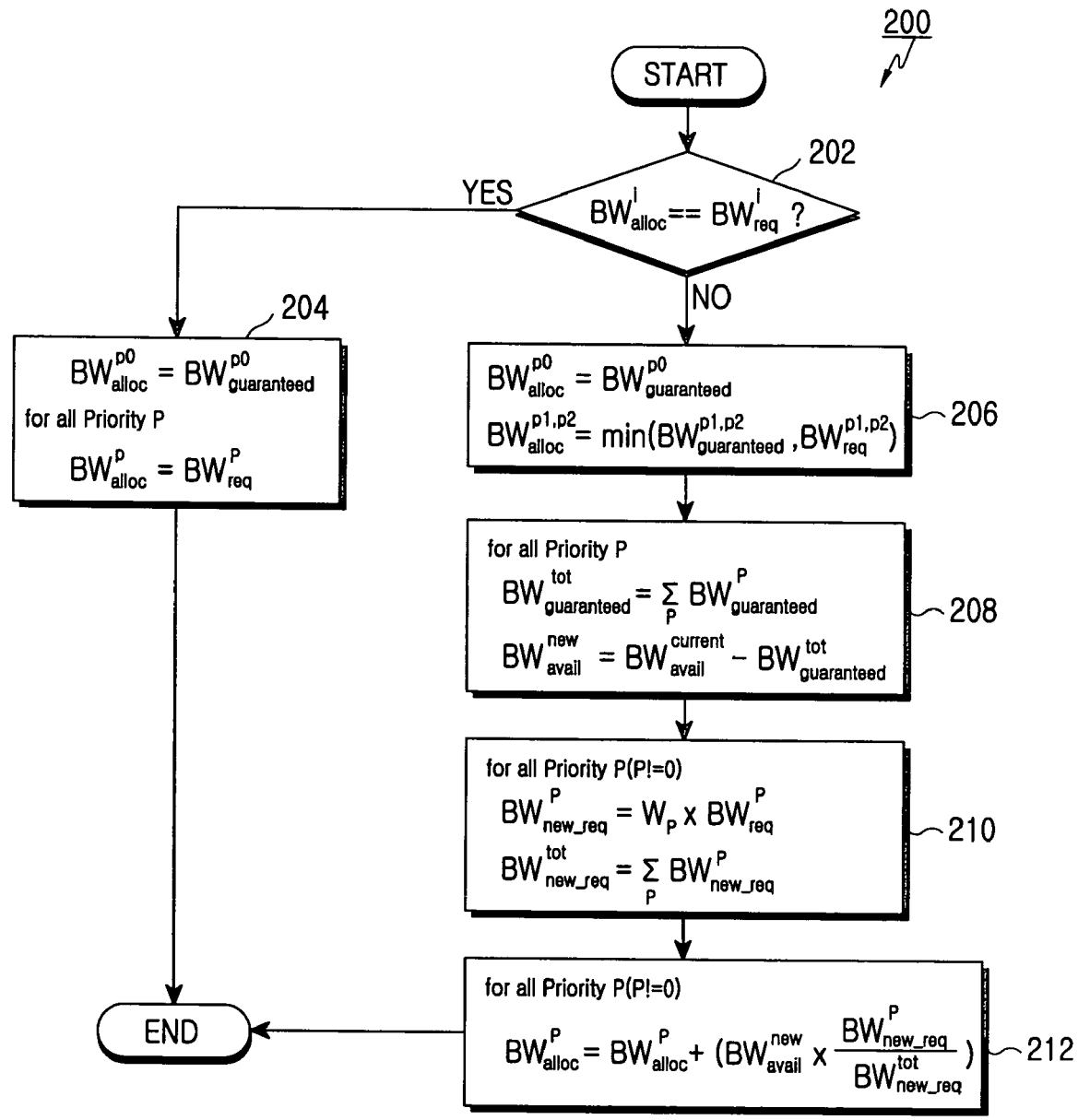
FIG. 5 is a flow chart illustrating a proportional allocation algorithm in accordance with one embodiment of the present invention.
Figure 6:
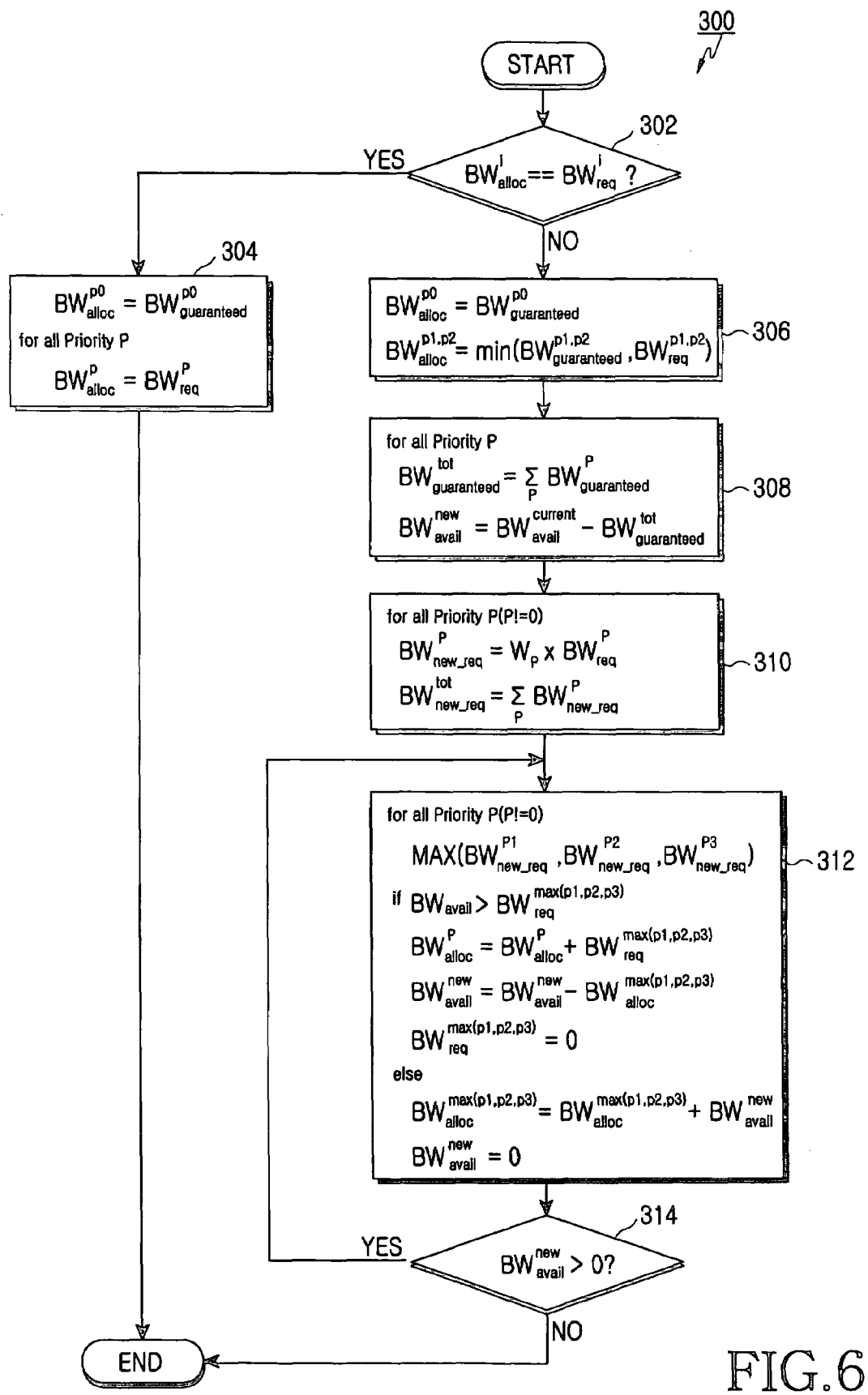
FIG. 6 is a flow chart illustrating a MRFA (Maximum Request First Allocation) algorithm in accordance with another embodiment of the present invention.
Figure 7:
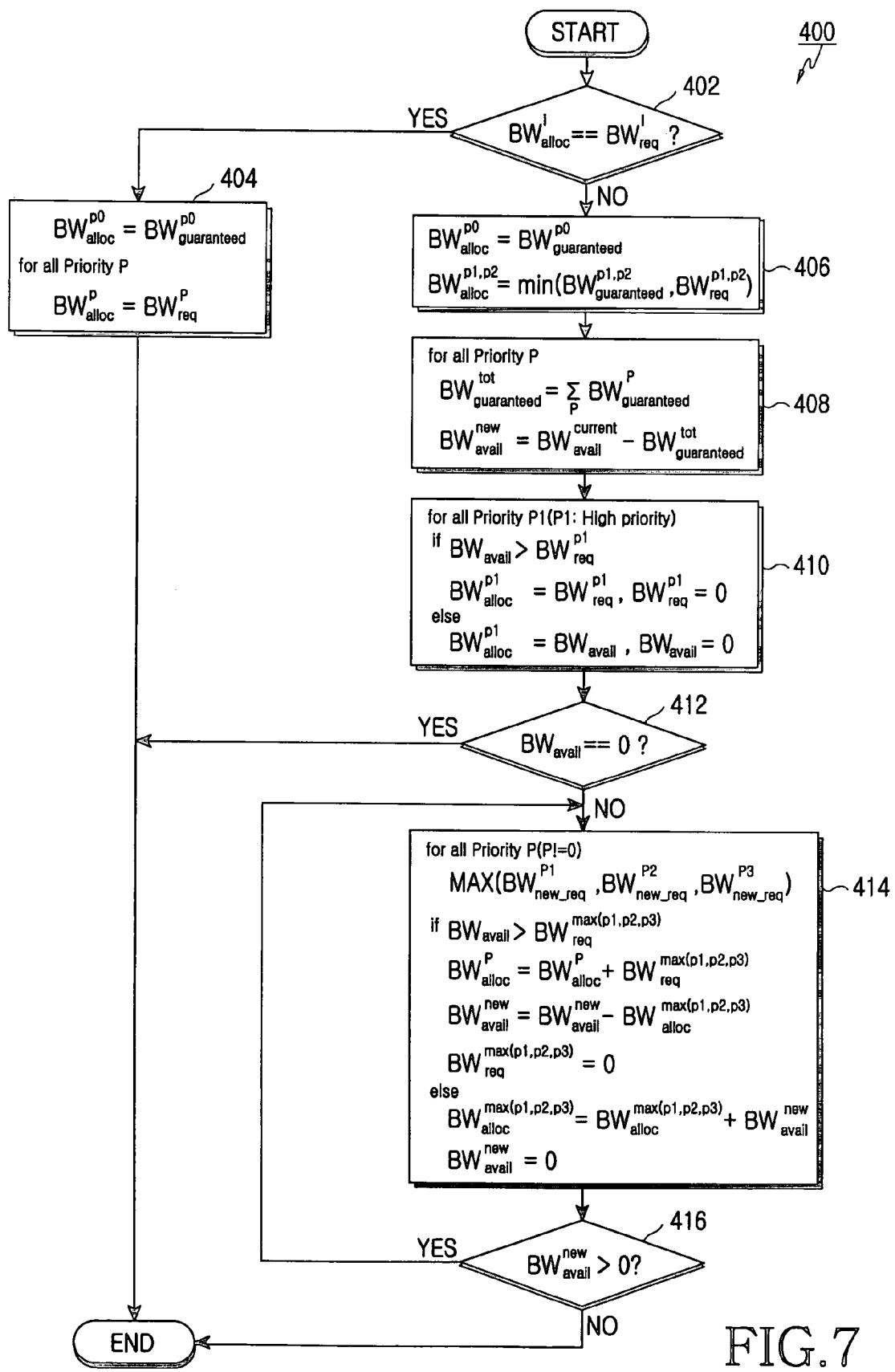
FIG. 7 is a flow chart illustrating a HRFA (High Priority First Allocation) algorithm in accordance with yet another embodiment of the present invention.

FIG. 5 is a flow chart illustrating a proportional allocation algorithm in accordance with this embodiment of the present invention. FIG. 6 is a flow chart illustrating the MRFA algorithm in accordance with another embodiment of the present invention. FIG. 7 is a flow chart illustrating an HRFA algorithm in accordance with yet another preferred embodiment of the present invention. Prior to describing three dynamic bandwidth allocation algorithms associated with the ONUs, it should be noted that "P0" is the highest priority service class, P1 and P2 are two service classes each having a priority lower than the P0's priority. Provided that bandwidth allocation requests associated with P0, P1 and P2 are firstly created, the following three dynamic bandwidth allocation algorithms can be performed.

1) Proportional Allocation Algorithm:

The schedulers 70 of the ONUs 60-1 to 60-N compare an available bandwidth $BW_{alloc}^i$ allocated by the OLT 50 with request bandwidths $BW_{req}^i$ of individual multiple-service queues 80, 82 and 84 at step 202. If $BW_{req}^i$ is equal to $BW_{alloc}^i$ at step 202, each scheduler 70 allocates a minimum guarantee bandwidth to the service class P0 having the highest priority at step 204, and allocates a request bandwidth to each queue of all service classes.

If $BW_{req}^i$ is different from $BW_{alloc}^i$ at step 202, the scheduler 70 allocates a minimum guarantee bandwidth to the service class P0 having the highest priority at step 206, and then allocates a minimum guarantee bandwidth to each of the remaining service classes P1 and P2 at step 206. The scheduler 70 adds all minimum guarantee bandwidths allocated to all the service classes P0, P1 and P2, subtracts an overall minimum guarantee bandwidth from a current available bandwidth, and determines whether the remaining bandwidth exists in the resultant bandwidth at step 208. The scheduler 70 determines new request bandwidths of individual queues 80, 82 and 84 considering weights of individual service classes in association with the remaining bandwidth, and calculates the sum of newly determined request bandwidths at step 210. The scheduler 70 multiplies the remaining bandwidth by the ratio of a new request bandwidth of each queue to an overall new request bandwidth to determine a new available bandwidth at step 212. In this way, the scheduler 70 allocates bandwidths to all queues each requesting a bandwidth.

Based on individual bandwidths proportionally allocated to individual ONUs 60-1 to 60-N, the ONUs 60-1 to 60-N perform bandwidth allocation in proportion to request bandwidths of multiple-service queues 80, 82 and 84, such that a only small allocation bandwidth is allocated to individual service queues in the case of performing dynamic bandwidth allocation. Therefore, the size of the remaining bandwidth and its generation frequency increase in proportion to the increased number of individual service queues. Particularly, in a P3 service for performing only dynamic bandwidth allocation without guaranteeing a minimum transfer function there frequently occurs a HOL problem, such that it has an increased remaining bandwidth.

To increase bandwidth usage efficiency, a bandwidth allocation algorithm must be developed for reducing the remaining bandwidth simultaneously with solving the HOL problem.

2) MRFA (Maximum Request First Allocation) Algorithm:

The MRFA algorithm is a dynamic bandwidth allocation algorithm for solving the HOL problem while reducing the remaining bandwidth. The MRFA algorithm applies weights to request bandwidths of individual queues so as to dynamically allocate a bandwidth received from the OLT to individual queues. Therefore, the MRFA algorithm first allocates a bandwidth to a service queue having the largest request bandwidth and allocates a bandwidth to the last service queue having the smallest request bandwidth.

Referring to FIG. 6, the scheduler 70 of the ONUs 60-1 to 60-N compares an available bandwidth $BW_{alloc}^i$ allocated by the OLT 50 with request bandwidths $BW_{req}^i$ of individual multiple-service queues 80, 82 and 84 at step 302. If the request bandwidth $BW_{req}^i$ is equal to the allocation bandwidth $BW_{alloc}^i$ at step 302, the scheduler 70 allocates a minimum guarantee bandwidth to the service class P0 having the highest priority at step 304, and allocates a request bandwidth to each queue of all service classes.

If the request bandwidth $BW_{req}^i$ is different from the allocation bandwidth $BW_{alloc}^i$ at step 302, the scheduler 70 first allocates a minimum guarantee bandwidth to the service class P0 having the highest priority at step 306, and then allocates a minimum guarantee bandwidth to each of the remaining service classes P1 and P2 at step 306. Then, the scheduler 70 adds all minimum guarantee bandwidths allocated to all the service classes P0, P1 and P2, subtracts an overall minimum guarantee bandwidth from a current available bandwidth $BW_{avail}^{current}$, and determines whether any remaining bandwidth exists in the resultant bandwidth at step 308. The scheduler 70 determines new request bandwidths of individual queues 80, 82 and 84 considering weights of individual service classes in association with the remaining bandwidth.

The scheduler 70 first allocates a bandwidth to a service queue having the largest request bandwidth, and finally allocates such a bandwidth to the last service queue having the smallest request bandwidth at step 312. In this regard, the scheduler 70 performs bandwidth allocation in descending numerical order of the new request bandwidth calculated in association with individual bandwidth request queues. If an available bandwidth of each bandwidth request queue is higher than a request bandwidth of each bandwidth request queue, a bandwidth allocated by the scheduler 70 is a maximum bandwidth requested by the queue. The scheduler 70 allocates a maximum bandwidth within the range of available bandwidth in descending numerical order of a request bandwidth. The scheduler 70 determines whether a current available bandwidth is found at step 314. If it is determined at step 314 that the current available bandwidth is found, step 312 is performed again.

The proportional allocation algorithm creates the remaining bandwidth corresponding to the number of maximum queues in association with a single ONU for every frame, but the MRFA algorithm creates a maximum of one remaining bandwidth. The remaining bandwidth is not affected by the number of queues. A maximum remaining bandwidth is affected by only the number of service queues each having a minimum guarantee bandwidth. The MRFA algorithm reduces the remaining bandwidth more than the proportional allocation algorithm for increasing the remaining bandwidth in response to the number of queues. This results in improved bandwidth usage efficiency. In addition, the MRFA algorithm is not affected by increasing the queues. This results in improved extensibility.

3) HPFA (High Priority First Allocation) Algorithm:

The HPFA algorithm solves the HOL problem while reducing the remaining bandwidth in the same manner as in the MRFA algorithm, resulting in improved bandwidth usage efficiency. The HPFA algorithm guarantees a bandwidth of a queue having the highest priority within the range of allocated bandwidth when allocating a bandwidth allocated by the OLT to individual queues, and determines a new request bandwidth considering request bandwidths and weights of individual queues when the remaining bandwidth is found. Bandwidth to a queue having the largest request bandwidth on the basis of the determined request bandwidth is allocated first. In this regard, the HPFA algorithm performs bandwidth allocation in descending numerical order of the request bandwidth of individual queues.

Referring to FIG. 7, the schedulers 70 of the ONUs 60-1 to 60-N compare an available bandwidth $BW_{alloc}^i$ allocated by the OLT 50 with request bandwidths $BW_{req}^i$ of individual multiple-service queues 80, 82 and 84 at step 402. If the request bandwidth $BW_{req}^i$ is equal to the allocation bandwidth $BW_{alloc}^i$ at step 402, the scheduler 70 allocates a minimum guarantee bandwidth to the service class P0 having the highest priority, and allocates a request bandwidth to each queue of all service classes at step 404.

If the request bandwidth $BW_{req}^i$ is different from the allocation bandwidth $BW_{alloc}^i$ at step 402, the scheduler 70 first allocates a minimum guarantee bandwidth to the service class P0 having the highest priority at step 406, and then allocates a minimum guarantee bandwidth to each of the remaining service classes P1 and P2 at step 406. Then, the scheduler 70 adds all minimum guarantee bandwidths allocated to all the service classes P0, P1 and P2, subtracts an overall minimum guarantee bandwidth from a current available bandwidth $BW_{avail}^{current}$, and determines whether the remaining bandwidth exists in the resultant bandwidth at step 408.

The scheduler 70 guarantees a bandwidth of a queue having high priority associated with the remaining bandwidth in the range of an allocated bandwidth. As shown in FIG. 7, request bandwidth allocation of the service queue P1 is performed within a prescribed bandwidth previously allocated to the highest priority queue P1. The scheduler 70 determines whether the remaining bandwidth is found at step 412. If the remaining bandwidth is found at step 412, the scheduler 70 determines a new request bandwidth considering request bandwidths and weights of individual queues at step 414, first allocates a bandwidth to a service queue having the largest request bandwidth, and finally allocates a bandwidth to a service queue having the smallest request bandwidth. In this regard, the scheduler 70 performs bandwidth allocation in descending numerical order of the request bandwidth of queues. If an available bandwidth of each bandwidth request queue is higher than a request bandwidth of each bandwidth request queue, a bandwidth allocated by the scheduler 70 is a maximum bandwidth requested by the queue. The scheduler 70 allocates a maximum bandwidth within the range of available bandwidth in descending numerical order of the request bandwidth. The scheduler 70 determines whether a current available bandwidth is found at step 416. If it is determined at step 416 that the current available bandwidth is found, step 414 is performed again.

The HPFA algorithm guarantees the highest priority queue, such that it can satisfy individual service requirements. Because the HPFA algorithm allocates only a previously-requested bandwidth, it provides low-priority queues with transfer opportunities, and a fair-queuing operation between individual queues can be guaranteed. If the transfer opportunity is first given to the highest priority queue when performing a bandwidth allocation process, i.e., if the transfer opportunity of the queues is guaranteed in descending priority order, the delay of low-priority queues becomes larger even though a low input load is provided. This operation is called a penalty phenomenon created at a low reception load. Data of a high-priority queue is first guaranteed at a predetermined data transfer start time, such that the above penalty phenomenon occurs. However, the HPFA algorithm does not allocate a bandwidth equal to that of the high priority queue, but allocates only a bandwidth requested by a previous frame, such that it can solve the penalty phenomenon. The HPFA algorithm creates a maximum of one remaining bandwidth in association with a single ONU for every frame, resulting in a reduction of a bandwidth consumed by the remaining bandwidth.

As apparent from the above description, an OLT scheduler according to aspects of the present invention performs scheduling upon receiving multiple-queue request information contained in the REPORT message from the ONU, and transmits a combined scheduling result associated with one ONU using a GATE message. Such ONU schedulers perform scheduling upon receiving a bandwidth allocated by the OLT, and allocate a transfer bandwidth to its own queues. A hierarchical structure subtracts the GATE and REPORT messages from individual queues, resulting in increased system extensibility. Furthermore, all the queues contained in one ONU successively perform data transmission with no guard time between packets, such that a conventional switch-over overhead problem is solved.

The dynamic bandwidth allocation algorithms according to embodiments of the present invention allow the OLT to communicate with the ONUs using the GATE and REPORT messages, such that it is compatible with a MPCP. In addition, the dynamic bandwidth allocation algorithms use an effective number of queues, have superior system extensibility, guarantee a fair-queuing operation, and use a bandwidth effectively.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for use by a GE-PON (Gigabit Ethernet Passive Optical Network) system which includes one OLT (Optical Line Terminal) and a plurality of ONUs (Optical Network Units) connected to the OLT via an ODN (Optical Distribution Network), said method for controlling the OLT to allocate bandwidth to each of the ONUs according to a bandwidth request signal for transferring data of the ONUs comprising the steps of:

a) selecting a minimum bandwidth guaranteed for individual services requested by the ONUs from among an overall available bandwidth, and allocating the minimum bandwidth to the ONUs;

b) if a current available bandwidth is found in the overall available bandwidth after allocating the minimum bandwidth to the ONUs sending the bandwidth request signal, allocating bandwidths requested by the ONUs when the sum of the bandwidths requested by the ONUs is lower than the current available bandwidth, determining new request bandwidths associated with the ONUs upon receiving magnitude and weight information of individual queues from the ONUs when the sum of the bandwidths requested by the ONUs is higher than the current available bandwidth, and performing bandwidth allocation in proportion to the determined request bandwidths, said weight information being representative of a priority associated with a service class specified by said ONU, wherein said bandwidth proportionally allocated to an ONU is limited to the bandwidth requested by said ONU.

2. A dynamic bandwidth allocation method for a GE-PON (Gigabit Ethernet Passive Optical Network) system which includes one OLT (Optical Line Terminal) and a plurality of ONUs (Optical Network Units) connected to the OLT via an ODN (Optical Distribution Network), said method for controlling the ONUs to allocate a bandwidth allocated by the OLT to queues of individual service classes according to a bandwidth request signal of individual service queues comprising the steps of:

a) allocating bandwidths requested by individual queues when an available bandwidth allocated by the OLT is larger than the sum of request bandwidths of individual queues sending the bandwidth request signal, and allocating a minimum guarantee bandwidth according to priority information of the service classes when the available bandwidth is less than the sum of request bandwidths of individual queues; and b) applying weights of individual service classes to a remaining bandwidth created by allocation of the minimum guarantee bandwidth within the available bandwidth, determining new request bandwidths associated with the queues according to the weights of the service classes, and allocating the remaining bandwidth in proportion to the determined request bandwidths, said weight information being representative of a priority associated with a service class specified by said ONU, wherein said bandwidth proportionally allocated to an individual queue is limited to the bandwidth requested by said individual, queue.

3. A dynamic bandwidth allocation method for a GE-PON (Gigabit Ethernet Passive Optical Network) system which includes one OLT (Optical Line Terminal) and a plurality of ONUs (Optical Network Units) connected to the OLT via an ODN (Optical Distribution Network), said method for controlling the ONUs to allocate a bandwidth allocated by the OLT to queues of individual service classes according to a bandwidth request signal of individual service queues comprising the steps of:

a) allocating bandwidths requested by individual queues when an available bandwidth allocated by the OLT is larger than the sum of request bandwidths of individual queues sending the bandwidth request signal, and allocating a minimum guarantee bandwidth according to priority information of the service classes when the available bandwidth is less than the sum of request bandwidths of individual queues; and b) allocating a bandwidth to a queue having the largest request bandwidth in a prescribed range of a remaining bandwidth created by allocation of the minimum guarantee bandwidth within the available bandwidth, and a bandwidth to a queue having the smallest request bandwidth after sequentially allocating bandwidths to other queues, said allocation being determined based on a weight information representative of a priority associated with a service class specified by said ONU, wherein said bandwidth proportionally allocated to an individual queue is limited to the bandwidth requested by said individual queue.

4. A dynamic bandwidth allocation method for a GE-PON (Gigabit Ethernet Passive Optical Network) system which includes one OLT (Optical Line Terminal) and a plurality of ONUs (Optical Network Units) connected to the OLT via an ODN (Optical Distribution Network), said method for controlling the ONUs to allocate a bandwidth allocated by the OLT to queues of individual service classes according to a bandwidth request signal of individual service queues comprising the steps of:

a) allocating bandwidths requested by individual queues when an available bandwidth allocated by the OLT is larger than the sum of request bandwidths of individual queues sending the bandwidth request signal, and allocating a minimum guarantee bandwidth according to priority information of the service classes when the available bandwidth is less than the sum of request bandwidths of individual queues; and b) firstly allocating a bandwidth to a queue having the highest priority in a prescribed range of a remaining bandwidth created by allocation of the minimum guarantee bandwidth within the available bandwidth, determining new request bandwidths associated with the remaining queues according to weights of individual service classes, and performing bandwidth allocation in proportion to the determined request bandwidths, said weight information being representative of a priority associated with a service class specified by said ONU, wherein said bandwidth proportionally allocated to an individual queue is limited to the bandwidth requested by said individual queue.

5. A GE-PON (Gigabit Ethernet Passive Optical Network) system comprising:

an OLT (Optical Line Terminal);

a plurality of ONUs (Optical Network Units) connected to the OLT via an ODN (Optical Distribution Network);

means for selecting a minimum bandwidth guaranteed for individual services requested by the ONUs from among an overall available bandwidth, and allocating the minimum bandwidth to the ONUs; and means for, if a current available bandwidth is found in the overall available bandwidth after allocating the minimum bandwidth to the ONUs sending a bandwidth request signal, allocating bandwidths requested by the ONUs when the sum of the bandwidths requested by the ONUs is lower than the current available bandwidth, determining new request bandwidths associated with the ONUs upon receiving magnitude and weight information of individual queues from the ONUs when the sum of the bandwidths requested by the ONUs is higher than the current available bandwidth, and performing bandwidth allocation in proportion to the determined request bandwidths, said weight information being representative of a priority associated with a service class specified by said ONU, wherein said bandwidth proportionally allocated to an ONU is limited to the bandwidth requested by said ONU.

6. A GE-PON (Gigabit Ethernet Passive Optical Network) system comprises:

an OLT (Optical Line Terminal);

a plurality of ONUs (Optical Network Units) connected to the OLT via an ODN (Optical Distribution Network);

means for allocating bandwidths requested by a plurality of queues for a plurality of service classes when an available bandwidth allocated by the OLT is larger than the sum of request bandwidths of individual queues sending a bandwidth request signal, and allocating a minimum guarantee bandwidth according to priority information of the service classes when the available bandwidth is less than the sum of request bandwidths of the individual queues; and means for applying weights of individual service classes to a remaining bandwidth created by allocation of the minimum guarantee bandwidth within the available bandwidth, determining new request bandwidths associated with the queues according to the weights of the service classes, and allocating the remaining bandwidth in proportion to the determined request bandwidths, said weight information being representative of a priority associated with a service class specified by said ONU, wherein said bandwidth proportionally allocated to an individual queue is limited to the bandwidth requested by said individual queue.

7. A GE-PON (Gigabit Ethernet Passive Optical Network) system comprising:
- an OLT (Optical Line Terminal);
- a plurality of ONUs (Optical Network Units) connected to the OLT via an ODN (Optical Distribution Network);
- means for allocating bandwidths requested by a plurality of queues for a plurality of services classes when an available bandwidth allocated by the OLT is larger than the sum of request bandwidths of individual queues sending a bandwidth request signal, and allocating a minimum guarantee bandwidth according to priority information of the service classes when the available bandwidth is less than the sum of request bandwidths of individual queues; and
- means for allocating a bandwidth to a queue having the largest request bandwidth in a prescribed range of a remaining bandwidth created by allocation of the minimum guarantee bandwidth within the available bandwidth, and finally allocating a bandwidth to a queue having the smallest request bandwidth after sequentially allocating bandwidths to other queues said weight information being representative of a priority associated with a service class specified by said ONU, wherein said bandwidth proportionally allocated to an individual queue is limited to the bandwidth requested by said individual queue.

8. A GE-PON (Gigabit Ethernet Passive Optical Network) system;
- an OLT (Optical Line Terminal);
- a plurality of ONUs (Optical Network Units) connected to the OLT via an ODN (Optical Distribution Network);
- means for allocating bandwidths requested by a plurality of queues for a plurality of services classes when an available bandwidth allocated by the OLT is larger than the sum of request bandwidths of individual queues sending a bandwidth request signal, and allocating a minimum guarantee bandwidth according to priority information of the service classes when the available bandwidth is less than the sum of request bandwidths of individual queues; and
- means for allocating a bandwidth to a queue having the highest priority in a prescribed range of a remaining bandwidth created by allocation of the minimum guarantee bandwidth within the available bandwidth, determining new request bandwidths associated with the remaining queues according to weights of individual service classes, and performing bandwidth allocation in proportion to the determined request bandwidths said weight information being representative of a priority associated with a service class specified by said ONU, wherein said bandwidth proportionally allocated to an individual queue is limited to the bandwidth requested by said individual queue.

* * * * *